United States Patent [19]
Schniederjan et al.

[11] Patent Number: 6,082,107
[45] Date of Patent: Jul. 4, 2000

[54] ROTARY MECHANISM CONTROL SYSTEM WITH BILATERAL BRAKING

[75] Inventors: Reinhold Schniederjan, Neu-Ulm; Bernhard Adler, Elchingen, both of Germany

[73] Assignee: Brueninghaus Hydromatik GmbH, Elchingen, Germany

[21] Appl. No.: 09/142,931
[22] PCT Filed: May 20, 1997
[86] PCT No.: PCT/EP97/02570
§ 371 Date: Sep. 17, 1998
§ 102(e) Date: Sep. 17, 1998
[87] PCT Pub. No.: WO97/44536
PCT Pub. Date: Nov. 27, 1997

[30] Foreign Application Priority Data

May 22, 1996 [DE] Germany ............... 196 20 664
Jun. 25, 1996 [DE] Germany ............... 196 25 393

[51] Int. Cl.[7] .................................................. F16D 31/02
[52] U.S. Cl. ............................................. 60/444; 60/452
[58] Field of Search ....................... 60/443, 444, 452, 60/460

[56] References Cited

U.S. PATENT DOCUMENTS 3,921,503  11/1975  Kubik ............................ 60/444
4,554,991  11/1985  Eden .
4,571,941   2/1986  Aoyagi et al. .................. 60/444

FOREIGN PATENT DOCUMENTS 40 01 888 A1   8/1990  Germany .
44 05 472 A1   8/1995  Germany .
184748        11/1982  Japan ............................ 60/444
184749        11/1982  Japan ............................ 60/444

OTHER PUBLICATIONS

Patent Abstracts of Japan, Publication Number 6 1031534 dated 2/14/86.

*Primary Examiner*—F. Daniel Lopez
*Attorney, Agent, or Firm*—Scully, Scott, Murphy & Presser

[57] ABSTRACT

The invention relates to a hydraulic controller (1), in particular for the control of the rotating mechanism of an excavator. A hydraulic motor (5) is driven by means of a hydraulic pump (2) in a hydraulic drive circuit, the hydraulic pump (2) and the hydraulic motor (5) being connected by a first and a second working line (3, 4). The hydraulic controller (1) includes an adjustment arrangement (26) for adjusting a setting piston (28a), acting on the displacement volume of the hydraulic pump (2), arranged between two setting pressure chambers (26, 27), in dependence upon the pressure difference between two control lines (20, 21). In accordance with the invention, a respective separate brake valve (24; 25) is provided in each connection between each of the two setting pressure chambers (26; 27) with the pressure fluid tank (10).

14 Claims, 4 Drawing Sheets

ROTARY MECHANISM CONTROL SYSTEM WITH BILATERAL BRAKING

BACKGROUND OF THE INVENTION

1. Field of the Invention

The present invention relates to a hydraulic controller in particular for the control of the rotating mechanism of an excavator.

2. Discussion of the Prior Art

A hydraulic controller such as for the control of the rotating mechanism of an excavator is known from DE 44 05 472 A1. This publication discloses a hydraulic controller for the control of a rotating mechanism having a brake valve. The brake valve serves for the sensitive braking of the rotating mechanism by means of control of the braking moment. The brake valve connects a pre-control arrangement, controlling the setting arrangement, with the pressure fluid tank. Thereby, the return flow of the pressure fluid, out of the setting pressure chamber acted on upon acceleration of the rotating mechanism, to the pressure fluid tank, is throttled during the braking, and thus the braking procedure is delayed.

Disadvantageous with this known hydraulic rotating mechanism controller is, however, that solely one brake valve is provided and thus the return flow of the pressure fluid out of the two setting pressure chambers of the setting arrangement is not effected independently of each other. This can influence the dependability of the hydraulic controller. Further, with this known hydraulic rotating mechanism controller, it is disadvantageous that the brake valve responds also when the rotation movement of the rotating mechanism encounters a resistance upon braking. Such a resistance is e.g. brought about in that the excavator is located on an inclined plane and the boom of the rotating mechanism moves uphill during the braking procedure. This situation occurs relatively frequently on building sites which naturally have uneven ground. Further, a corresponding resistance arises when the boom of the rotating mechanism swings into a mound of earth or the like.

SUMMARY OF THE INVENTION

It is thus the object of the present invention to so further develop the known rotating mechanism controller that dependability is increased.

The solution in accordance with the invention is based upon the insight that the dependability of the hydraulic controller can be increased in that its own, separate brake valve is associated with each of the two setting pressure chambers of the adjustment arrangement, whereby each of the two brake valves is controlled by means of the force difference between a setting force exercised by the control pressure and a return force exercised by a return member.

A further solution pursuant of the invention is based on the insight that in the working lines connecting the hydraulic pump with the hydraulic motor a pressure reversal occurs when the rotating mechanism can rotate further without resistance during the braking procedure. When, however, during the braking procedure the rotating mechanism is exposed to a resistance, e.g. due to the down-slope force or an impact, this pressure-side reversal does not occur, i.e. the working line acted upon with high pressure during they acceleration phase is also acted upon with high pressure during the braking procedure. The invention exploits this insight in that for each of the setting pressure chambers a respective separate brake valve is provided which in each case is connected with one of the working lines. The brake valves are thereby controlled in dependence upon the pressure difference between the working pressure in the associated working line and the control pressure. Thereby during the braking procedure with substantially pressureless control lines, only that brake valve responds the associated working line of which is acted upon with high pressure.

The brake valves may be constituted as switch-over valves having a throttled and a non-throttled switching position. During the acceleration phase, in which the control lines are acted upon with control pressure, the brake valves are in their non-throttled switching position. During the braking phase, in which the control lines are substantially pressureless, the brake valves are switched into their throttled switching position, in order to delay the braking procedure.

Corresponding to an embodiment, the brake valves can have each a control pressure chamber which is connected with the control lines. For selection of that control line which carries the higher pressure a change-over valve may be provided.

Corresponding to another aspect, each brake valve is connected with that working line which, in the swinging out of the hydraulic pump prior to the braking procedure, forms the low pressure return line of the drive circuit.

The brake valves may be formed as switch-over valves having a throttled and a non-throttled switching position. During the acceleration phase, in which the control lines are acted upon with control pressure, the brake valves are located in their non-throttled switching position. During the braking phase, in which the control lines are substantially pressureless, that brake valve whose associated working line is acted upon with high pressure is switched into its throttled switching position.

In the case of resistance-free braking of the rotating mechanism a pressure-side reversal occurs in the working line, i.e. that working line which formed the low pressure working line during the acceleration phase, provides the high pressure working line in the braking phase. Thus, that brake valve responds whose associated setting pressure chamber was acted upon with setting pressure during the acceleration phase. In contrast, if the rotating mechanism is exposed to resistance during the braking procedure, this pressure-side reversal does not took place. The brake valve associated with that setting pressure chamber which was acted upon with setting pressure during the acceleration phase does not respond in this case, so that the corresponding setting pressure chamber can be rapidly relieved via the brake valve in the non-throttled switching position. Thereby, an uncontrolled further slewing of the rotating mechanism is prevented.

Furthermore, the brake valves may have each two control pressure chambers, whereby one of the control pressure chambers is connected with the associated working line and the other control pressure chamber with the control lines. For the selection of that control line which carries the higher pressure there may be provided a change-over valve.

According to the invention, the brake valves can be particularly advantageously arranged directly at the control lines, whereby corresponding to claim 12 there may be provided between the brake valves and the associated setting pressure chambers an after-suction arrangement, in order to ensure a prompt after-flow of pressure fluid on the suction side upon return of the setting piston.

For limiting the control pressure in the control lines to a maximum pressure, a pressure cut-off valve may be provided.

BRIEF DESCRIPTION OF THE DRAWINGS

The invention will be described in more detail below with reference to a preferred exemplary embodiment and with reference to the drawings. In the drawings.

DETAILED DESCRIPTION OF PREFERRED EMBODIMENTS

Figure 1:
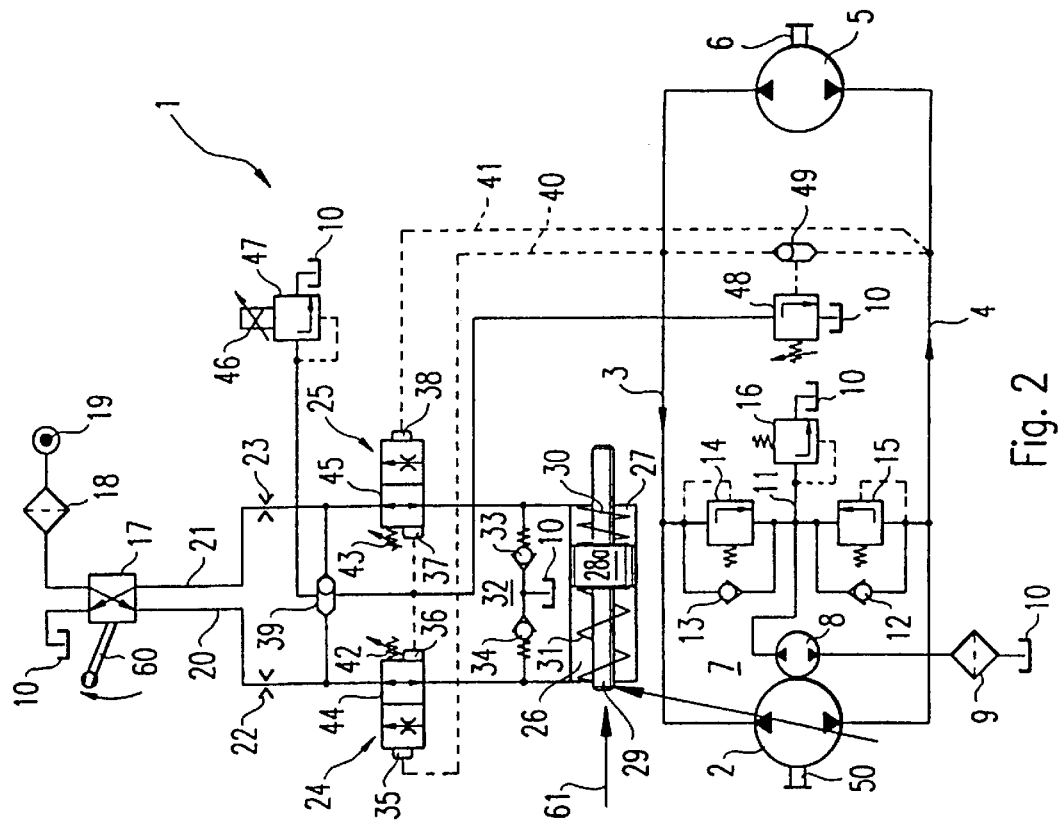
FIG. 1 shows a first exemplary embodiment of the hydraulic controller in accordance with the invention, in the neutral position.

FIG. 1 shows a first exemplary embodiment of the controller in accordance with the invention. In the exemplary embodiments, the controller 1 is configured for the control of the rotating mechanism of an excavator.

The adjustable hydraulic pump 2 is connected via a drive shaft 50 with a drive motor (not shown), e.g. a Diesel motor. By way of a drive circuit formed by the working lines 3 and 4, the hydraulic motor 5 is in connection with the hydraulic pump 2. The hydraulic motor 5 drives, via a drive shaft 6, the rotating mechanism (not shown) of the excavator.

The pressure fluid in the drive circuit is after-fed via a feed arrangement 7, which includes a feed pump 8 likewise connected with the drive motor. The feed pump 8 continuously sucks pressure fluid, via a feed filter 9, out of a pressure fluid tank 10, and feeds this into the feed line 11. The feed line is connected with the working lines 3 and 4 via check valves 12 and 13, and feeds the pressure fluid in each case into the working line 3 or 4 carrying the lower pressure. The feed pressure is regulated by means of pressure regulation valves 14 and 15. The over-pressure valve 16 serves for limiting the pressure in the feed line The control of the displacement volume of the hydraulic pump 2 is effected via the hand controller 17, which is in connection with the pressure fluid tank 10 and, via the control pressure filter 18, with a control pressure in-feed 19. The hand controller 17 applies a control pressure to one of the two control lines 20 or 21 in dependence upon its deflection. In the neutral position illustrated in FIG. 1, both control lines 20 and 21 are vented via the hand controller 17 to the pressure fluid tank 10.

The control lines 20, 21 are connected each with a respective setting pressure chamber 26 and 27 of the adjustment arrangement 28, via throttle points 22 and 23 and brake valves 24 and 25 to be described in more detail.

Between the setting pressure chambers 26 and 27, there is arranged a setting piston 28a, which adjusts the displacement volume of the hydraulic pump 2 via a piston rod 29. The setting piston 28a is centered in its neutral position shown in FIG. 1, via centering springs 30 and 31.

Between each brake valve 24 and 25 and the setting pressure chamber 26 and 27 associated therewith, an after-suction arrangement 32 opens into the control lines 20 and 21. In the illustrated exemplary embodiment, the after-suction arrangement 32 consists of two check valves 33 and 34 and serves for the after-suction of pressure fluid out of the pressure fluid tank 10 during the return of the setting piston 28a into its neutral position.

The brake valves 24 and 25 have each two control pressure chambers 35 and 36 or 37 and 38. The control pressure chambers 36 and 37 are connected with the two control lines 20 and 21 via a change-over valve 39. The control pressure chambers 35 and 38 lying opposite to the control pressure chambers 36 and 37 are connected each with one of the two working lines 3 or 4 via working line connection lines 40 and 41. In the neutral position shown in FIG. 1, both control lines 20 and 21 are vented to the pressure fluid tank 10 via the hand controller 17, so that the control pressure chambers 36 and 37 are pressureless. Since the setting piston 28a is located in its neutral position and thus the hydraulic pump works with zero displacement volume, the working lines 3 and 4 are likewise pressureless so that no pressure difference arises between the control pressure chambers 35 and 37 on the one hand and 36 and 38 on the other hand. Thus, the brake valves 24 and 25 are held their non-throttled switching positions 44 and 45 by means of the adjustable pressure springs 42 and 43.

For limiting the control pressure in the control lines 20 and 21, after throttle points 22 and 23 there is provided in the exemplary embodiment a pressure cut-off valve 47 which can be set by means of a setter 46, which limits the pressure-carrying control line 20 or 21, upon a predetermined maximum pressure being exceeded, to the pressure fluid tank 10. A further over-pressure valve 48 is controlled by the working lines 3 and 4 via a change-over valve 49.

The functioning of the brake valves 24 and 25 of the first exemplary embodiment, in accordance with the invention, will be described in more detail below with reference to the operating conditions of the hydraulic controller illustrated in FIGS. 2 to 4.

Figure 2:
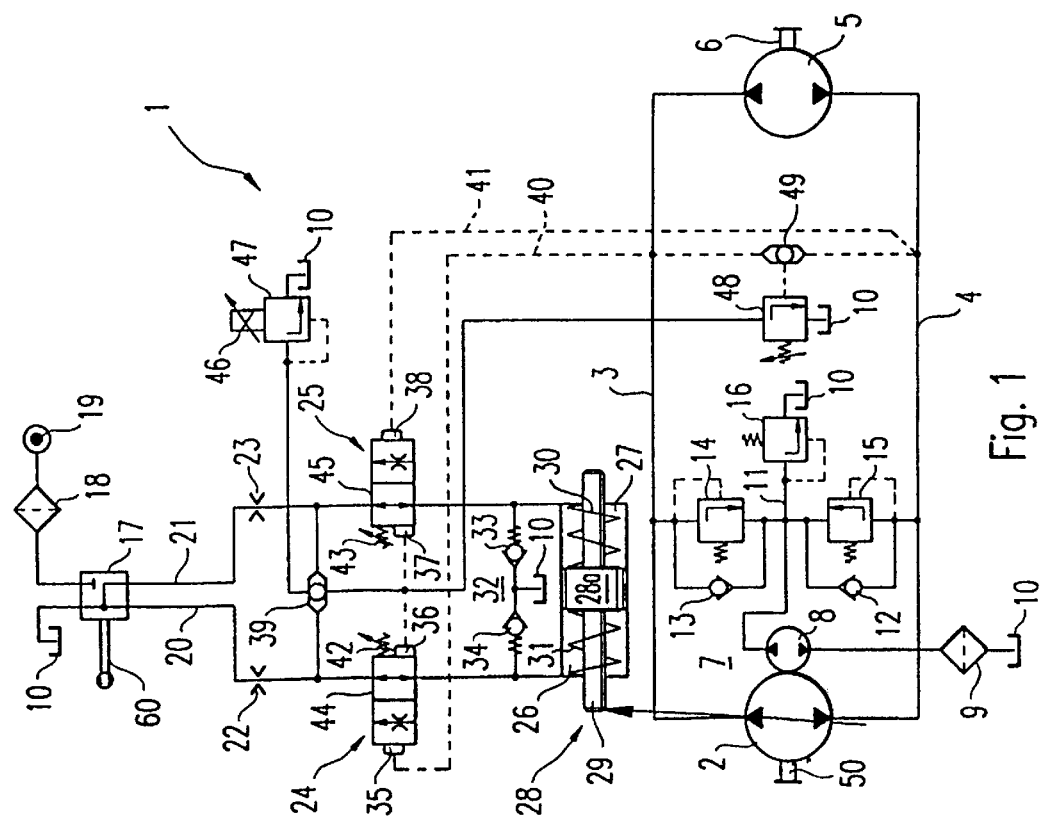
FIG. 2 shows the exemplary embodiment according to FIG. 1, during the acceleration phase.

FIG. 2 shows the hydraulic controller in the acceleration phase. By means of deflection of the control stick 60 of hand controller 70, the control line 20 is acted upon with control pressure via the control pressure filter 18 from the control pressure in-feed 19, whilst the other control line 21 is vented to the pressure fluid tank 10. Thereby, the setting pressure chamber 26 is acted upon with control pressure via the brake valve 24, so that the setting piston 28a displaces in the direction indicated by the arrow 61. The hydraulic pump 2 is correspondingly swung out, and a corresponding high pressure built up in the working line 4 in order to drive the hydraulic motor 5 in the desired direction of rotation. In this manner, the rotating mechanism of the excavator coupled to the hydraulic motor 5 is accelerated. The brake valves 24 and 25 are, thereby, located in the non-throttled switching positions 44 and 45, since during the acceleration phase shown in FIG. 2 there is present in the control line 20 and thus also in the control pressure chambers 36 and 37 a corresponding control pressure which urges the brake valves 24 and 25 into their non-throttled switching position.

Figure 3:
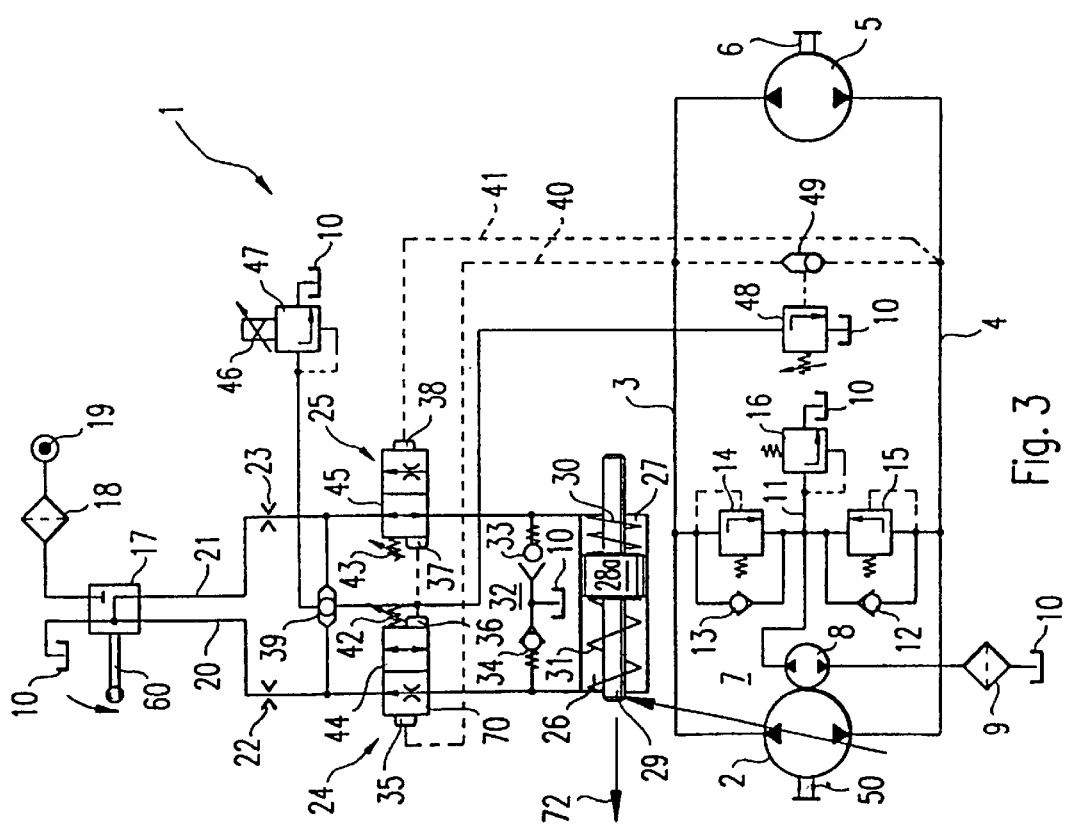
FIG. 3 shows the exemplary embodiment according to FIG. 1 during the delay phase, when the rotating mechanism experiences no rotation resistance.

After attainment of the desired rotational speed, the control stick 60 can be released by the operator, so that this swings back into the neutral position illustrated in FIG. 3. Thereupon, the control line 20 and also the control line 21 are vented to the pressure fluid tank 10 and the control pressure in the control line 20 is reduced. Correspondingly, the control pressure chambers 36 and 37 of the brake valves 24 and 25 are no longer acted upon with control pressure.

Because of the pressure fluid filled in the setting pressure chamber 26 during the acceleration phase, the hydraulic pump 2 is however initially still in its swung out position. Insofar as the rotating mechanism coupled to the hydraulic motor 5 can rotate freely in this delay phase illustrated in FIG. 3, without being exposed to any resistance, there builds up a pressure in the working line 3 whilst the pressure in the working line 4 falls below the pressure prevailing in the working line 3. There thus occurs a pressure-side reversal, whereby the working line 3, working as low pressure working line during the acceleration phase, now becomes the high pressure working line and the working line 4, serving as high pressure working line during the acceleration phase, now becomes the low pressure working line. The present invention exploits this effect.

The control pressure chamber 35 of the brake valve 24 connected via the working line connection line 40 with the high pressure working line 3 now brings about a switch-over of the brake valve 24 into the throttled switching position 70. In the delay phase illustrated in FIG. 3, the setting piston 28a is urged back into its neutral position illustrated in FIG. 1 by means of the centering springs 26 and 27, as is indicated by means of the arrow 72. The return flow of the pressure fluid out of the setting pressure chamber 26 via the control line 20 towards the pressure fluid tank 10 is however throttled by the brake valve 24 located in the control line 20, since this brake valve 24 is in its throttled switching position. The return of the setting piston 28 thus occurs in this operational condition relatively slowly, which manifests itself in a sensitive, delayed braking of the rotating mechanism.

The under-pressure which arises in the setting pressure chamber 27 through the return movement of the setting piston 28 brings about an after-suction of pressure fluid out of the pressure fluid tank 10 via the after-suction arrangement 32. Thereby, the check valve 33 opens.

Figure 4:
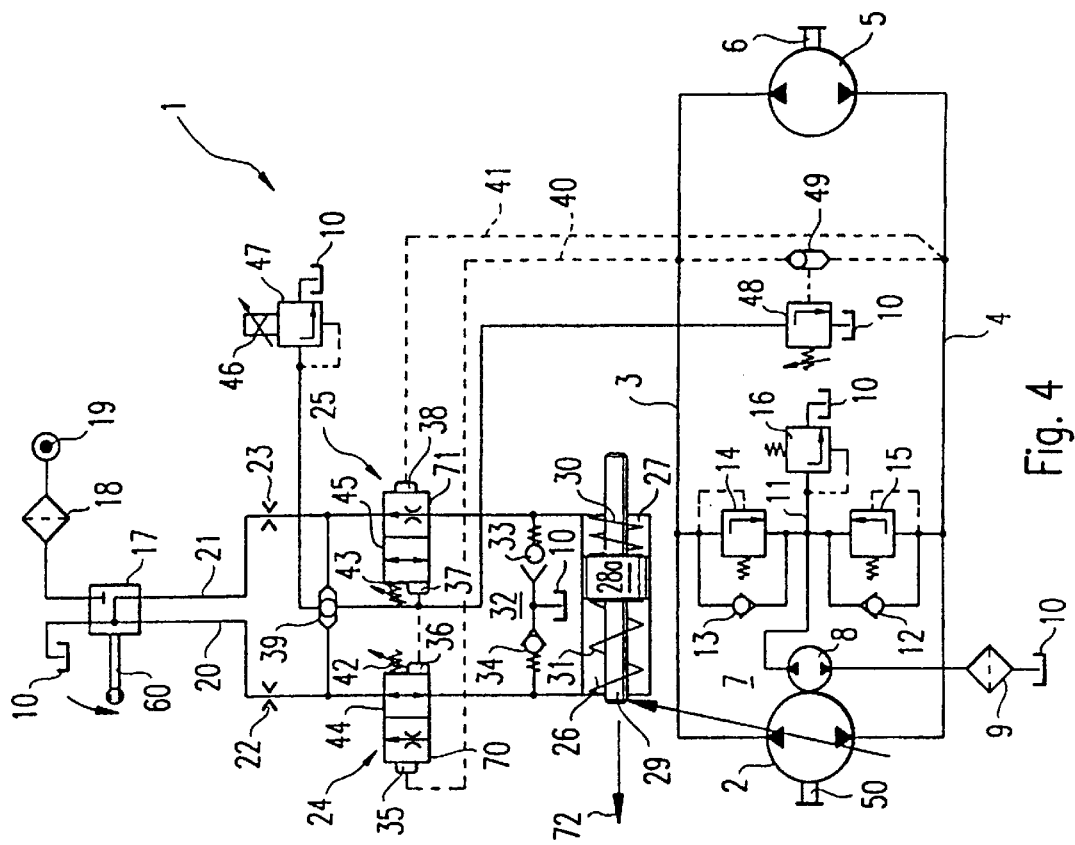
FIG. 4 shows the exemplary embodiment according to FIG. 1 during the delay phase, when the rotating mechanism experiences a rotation resistance.

In FIG. 4, the operational condition in the delay phase is illustrated for the case that the rotating mechanism is exposed to a resistance during the delay phase and the rotating mechanism cannot freely rotate corresponding its moment of inertia. Such a resistance is brought about in particular in that the excavator (in which the rotating mechanism is located) is standing on an inclined plane, as arises frequently on building sites. When the rotating mechanism is subjected to braking in a range of angle of rotation in which the boom located on the rotating mechanism moves up-slope, due to the down-slope forces a relatively rapid braking of the rotating mechanism occurs. The pressure-side reversal described with reference to FIG. 3 thereby does not occur. Rather, the hydraulic motor 5 is further driven by the hydraulic pump 2 which is still swung out. In this operational condition there is thus built up in the working line 4 a high pressure, whilst the working line 3 works as low pressure return flow line.

In the operational condition illustrated in FIG. 4, not the brake valve 24 but the brake valve 25 in this case connected with the working line 4 acted upon by high pressure is displaced into its throttled switching position 71. It is significant for the invention that the switch-over valve 24, in contrast to the operating condition explained with reference to FIG. 3, remains in its non-throttled switching position 44. The pressure fluid filled into the setting pressure chamber 26 during the acceleration phase can, during the return of the setting piston 28a into its neutral position by means of the centering springs 30 and 31, thus escape relatively rapidly via the non-throttled brake valve 24 and the control line 20 towards the pressure fluid tank 10.

The switching position of the other brake valve 25 is in this operational condition of no significance, since the pressure fluid after-flowing into the setting pressure chamber 27 is drawn not via the brake valve 25 but via the after-suction arrangement 32, i.e. via the opened check valve 33, out of the pressure fluid tank 10. The setting piston 28a is thus, in contrast to the operational condition illustrated in FIG. 3, relatively rapidly returned into its neutral position illustrated in FIG. 1. This determines a relatively rapid swinging back of the hydraulic pump 2 to zero displacement volume, so that the hydraulic motor 5 is not further driven by this pump. By these means, an uncontrolled further slewing of the rotating mechanism is effectively prevented in this operational condition.

This is in particular of substance also if the boom of the rotating mechanism meets a rigid resistance, in which the boom impacts on a mound of earth or the like.

When the hydraulic pump 2 is swung out in the reverse delivery direction, in that during the acceleration phase the control line 21 is acted upon with control pressure by means of the hand controller 17, the hydraulic controller in accordance with the invention works in accordance with the same principle. However, in this case, the return flow of the pressure fluid out of the setting pressure chamber 27 filled during the acceleration phase, towards the pressure fluid tank 10, is controlled via the brake valve 25 in the delay phase as described above, whilst the switching position of the brake valve 24 is then of no significance.

Figure 5:
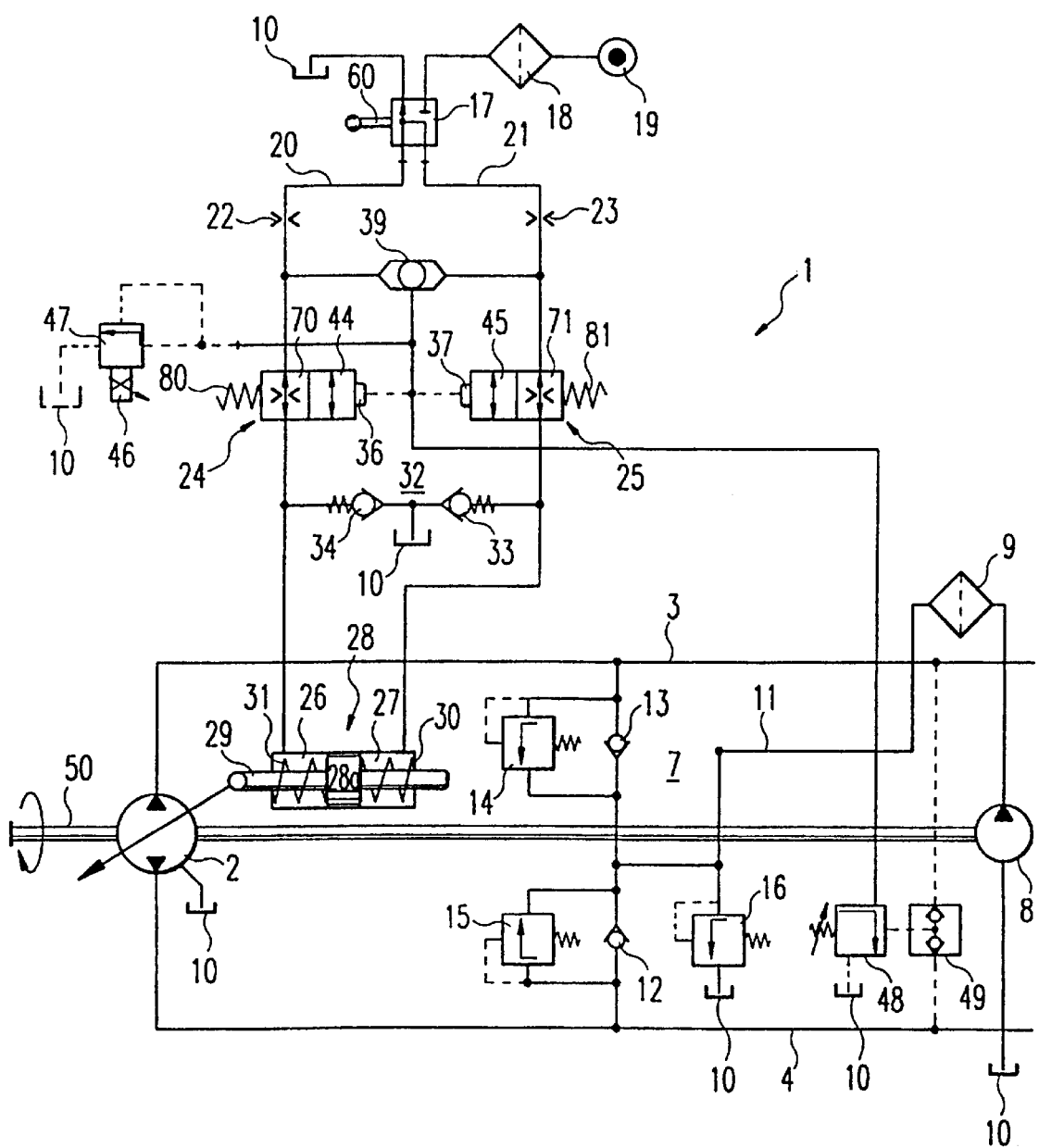
FIG. 5 shows a second exemplary embodiment of the hydraulic controller in accordance with the invention, in the neutral position.

FIG. 5 shows a second exemplary embodiment of the controller in accordance with the invention, in its neutral position. Also in this exemplary embodiment, the controller 1 is configured for the control of the rotating mechanism of an excavator. Elements already described are provided with corresponding reference signs so that in this regard a repeated description is not necessary.

In the exemplary embodiment illustrated in FIG. 5, the brake valves 24 and 25 have each a control pressure chamber 36 or 37. The control pressure chambers 36 and 37 are connected via a change-over valve 39 with the two control lines 20 and 21. Lying opposite the control pressure chambers 36 and 37, respective return members are provided in the form of return springs 80 and 81. Each of the two brake valves 24 and 25 is thus controlled through the force difference between a setting force exercised by the control line 20 or 21 which is acted upon by the highest control pressure and a return force exercised by the respective return spring 80 or 81. In the neutral position illustrated in FIG. 5, the two control lines 20 and 21 are vented to the pressure fluid tank 10 via the hand controller 17, so that the control pressure chambers 36 and 37 are pressureless. The braking valves 24 and 25 are thus switched into their respective throttled switching position 70 and 71 by means of the return springs 80 and 81.

Below, the functioning of the brake valves 24 and 25 in accordance with the invention, according to the exemplary embodiment illustrated in FIG. 5, will be described in more detail.

For accelerating the rotating mechanism of the excavator, the hydraulic pump 2 is swung out in one of its delivery directions corresponding to the intended direction of rotation. For this purpose, via the control stick 60 of the hand controller 17, the control line 20 or the control line 21 is acted upon with control pressure, via the control pressure filter 18, from the control pressure in-feed 19, whilst in each case the other control line is vented to the pressure fluid tank 10. Through this, the setting pressure chamber 26 or the setting pressure chamber 27 is acted upon with control pressure via the brake valve 24 or the brake valve 25, so that the setting piston 28a is correspondingly displaced. The hydraulic pump 2 is correspondingly swung out, and a corresponding high pressure built up in one of the working lines 3 or 4 in order to drive the hydraulic motor (not shown in FIG. 5) in the desired direction of rotation and to accelerate the rotating mechanism of the excavator. The brake valves 24 and 25 are in the non-throttled switching position 44 and 45, since during the acceleration phase there is present in one of the two control lines 20 or 21 and thus also in the control pressure chambers 36 and 37 a corresponding control pressure, which urges the brake valves 24 and 25 into their non-throttled switching positions 44 and 45.

After attainment of the desired speed of rotation, the control stick 60 can be released by the operator, so that this swings back into its neutral position. In response, the control line 20 and also the control line 21 is vented to the pressure fluid tank 10 and the control pressure in the control lines 20, 21 falls. Correspondingly, the control pressure chambers 36 and 37 of the brake valves 24 and 25 are no longer acted upon with control pressure.

Due to the pressure fluid filled, during the acceleration phase, in one of the control pressure chambers 26 or 27, the hydraulic pump 2 is however initially further in its swung out position. The pressure fluid escapes from the setting pressure chamber 26 or 27, acted upon with pressure fluid during the acceleration phase, via the brake valve 24 or 25 associated with the setting pressure chamber and the and controller 17, to the pressure fluid tank 10. Thereby, he two brake valves 24 and 25 are now located in their throttled switching position 70 and 71, since these are acted upon by the associated return springs 80 and 81 and the control pressure chambers 36 and 37 are substantially pressureless. The return flow of the pressure fluid out of the respective setting pressure chamber 26 or 27 is thus throttled by the respective associated brake valve 24 or 25. The return of the setting piston 28 thus occurs relatively slowly, which is manifested in a sensitive, delayed braking of the rotating mechanism.

The under-pressure arising, due to the return of the is setting piston 28, in the setting pressure chamber not acted upon with setting pressure during the acceleration phase brings about an after-suction of pressure fluid out of the pressure fluid tank 10 via the after-suction arrangement 32. Thereby, the respective non-return valve 33 or 34 opens.

Through the association of a respective separate brake valve 24 or 25 with each setting pressure chamber 26 and 27 of the adjustment arrangement, the operational safety of the rotating mechanism controller is significantly improved, without substantially increasing the outlay. Through the arrangement of the brake valves 24 and 25 directly at the control lines 20 and 21, a particularly rapid response of the brake valves 24 and 25 is attained.

Further, the invention can also be employed in combination with a pre-controller such as is known in principle from DE 44 05 472 A1.

Figure 6:
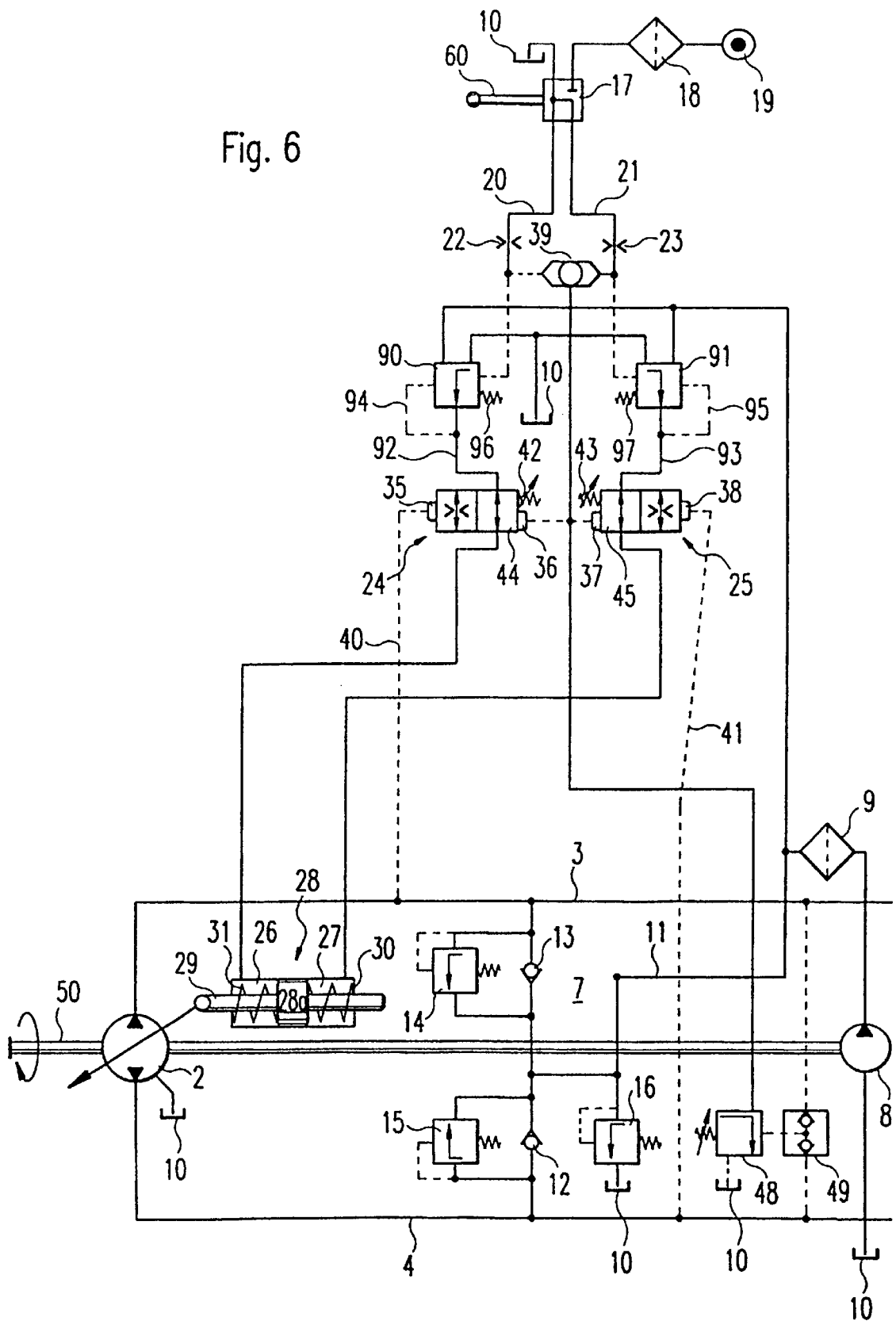
FIG. 6 shows a third exemplary embodiment of the hydraulic controller in accordance with the invention, in the neutral position.

FIG. 6 shows a hydraulic control in accordance with the present invention having another, expedient exemplary embodiment for a pre-controller. The third exemplary embodiment illustrated in FIG. 6 is similarly configured to the second exemplary embodiment illustrated in FIG. 5. Elements already described are thereby provided with corresponding reference signs, so that the following description relates solely to the differences and special features.

The feed arrangement 7 serves, in the exemplary embodiment illustrated in FIG. 6, not only for the after-feed of the working circuit 2 to 4 but also for the delivery of pressure fluid to the adjustment arrangement 28. Respective pressure regulation valves 90, 91 are associated with the brake valves 24 and 25, which pressure regulation valves are each arranged upstream of the associated brake valve 24, 25. The pressure regulation valves 90 and 91 are connected on the one hand with the feed line 11 of the feed arrangement 7 and on the other hand with the pressure fluid tank 10. Each pressure regulation valve 90, 91 is connected via a connection line 92, 93 with the associated brake valve 24, 25. The control of the pressure regulation valve 90 or 91 is effected proportionally to the pressure difference between the setting pressure prevailing in the respective connection line 92 or 93 and the control pressure in the associated control line 20 or 21. For this purpose, in each case one of the control inputs of the pressure regulation valve 90 or 91 is connected via an associated by-pass line 94 or 95 with the connection line 92 or 93. In each case another control input of the pressure regulation valve 90 or 91 is connected with the associated control line 20 or 21. The setting pressure prevailing in the connection lines 92 and 93 is thus in substance proportional to the control pressure prevailing in the associated control line 20 or 21. However, by means of the pressure springs 96 and 97 it is attained that the setting pressure is slightly, e.g. 1 to 2 bar, above the control pressure prevailing in the associated control line 20 or 21.

During the acceleration phase the setting pressure prevailing in the respective setting pressure chamber 26 or 27 is metered through the respective pressure regulation valve 90 or 91 in substance proportionally to the control pressure prevailing in the respective control line 20 or 21. In the delay phase, the pressure fluid flows out of the setting pressure chamber 26 or 27, in the manner described with reference to FIGS. 1 to 4, via the respective brake valve 24 or 25 back to the pressure fluid tank 10 via the respective pressure limiting valve 90 or 91.

The after-suction arrangement 32 is not necessary in this exemplary embodiment since the pressure fluid supply of that setting pressure chamber the volume of which increases in the return to the neutral position is effected via the feed arrangement 7, the feed line 11 and the associated pressure regulation valve 90 or 91, and the associated brake valve 24 and 25. The advantage lies in particular in that no suction resistance is to be overcome; rather, via the feed pump 8, an active feed into the adjustment arrangement 28 is effected. A possible contamination by means of dirt particles is reliably and effectively avoided by means of the feed filter 9. In principle it is also possible to provide an after-suction filter in the passive after-suction arrangement 32. However, in comparison with the feed filter 9, this must be substantially larger in order to maintain the suction resistance as low as possible. This, however, conflicts with the goal of a construction which is as compact as possible.

The invention is not limited to the illustrated exemplary embodiment. In particular, the brake valves 24 and 25 need not necessarily be arranged directly in the control lines 20 and 21. They may be provided at any position in the return flow line between the setting pressure chambers 26 and 27 and the pressure fluid tank.

What is claimed is:

1. Hydraulic controller, for the control of the rotating mechanism of an excavator, having
a hydraulic drive circuit (2–4) with a hydraulic pump (2) and a hydraulic motor, and a first and a second working line (3,4) connecting the hydraulic pump (2) with the hydraulic motor,
an adjustment arrangement (26) for adjusting a setting piston (28a), acting on the displacement volume of the hydraulic pump (2), arranged between two setting pressure chambers (26,27), in dependence upon the pressure difference between two control lines (20,21) and characterized in that, a respective separate brake valve (24;25) is associated with each connection between teach of the two setting pressure chambers (26;27) with a pressure fluid tank (10), each said respective brake valve, responsive to a disappearing pressure in the control lines (20,21), throttling a return flow of the pressure fluid out of the setting pressure chambers (26,27) into the fluid pressure tank (10), whereby each of the two brake valves (24;25) is controlled by means of a force difference between a setting force exercised by the control pressure in the control line (20,21) acted upon by the greater control pressure and a return force exercised by a return member (80;81) provided for each brake valve (24;25).

2. Hydraulic controller according to claim 1, characterized in that, each brake valve (24; 25) is formed as a switch-over valve having a first switching position (44; 45) with non-throttled through-flow and a second switching position (70;71) with throttled through-flow, whereby each brake valve (24; 25) is in the first switching position (44; 45) when the force difference between the setting force and the return force is greater than a predetermined threshold value and each brake valve (24; 25) is in the second switching position (70; 71) when the force difference between the setting force and the return force is smaller than the predetermined threshold value.

3. Hydraulic controller according to claim 1 or 2, characterized in that, each brake valve (24; 25) has a respective control pressure chamber (36; 37) which is connected with the is control lines (20; 21).

4. Hydraulic controller according to claim 3, characterized in that, the control pressure chambers (36; 37) of the brake valves (24; 25) are connected with the control lines (20; 21) via a change-over valve (39).

5. Hydraulic controller according to claim 1, characterized in that, the return members are formed as return springs (80, 81).

6. Hydraulic controller, for the control of the rotating mechanism of an excavator, having a hydraulic drive circuit (2–4) with a hydraulic pump (2) and a hydraulic motor (5), and a first and second working line (3,4) connecting the hydraulic pump (2) with the hydraulic motor (5), an adjustment arrangement (28) for adjusting a setting piston (28a), arranged between two setting pressure chambers (26,27), acting on the displacement volume of the hydraulic pump (2), in dependence upon the pressure difference between two control lines (20,21) and a respective separate brake valve (24;25) is associated with each connection between each of the two setting pressure chambers (26;27) with a pressure fluid tank (10), each said respective brake valve, responsive to a disappearing pressure in the control lines (20,21), throttling a return flow of the pressure fluid out of the setting pressure chambers (26,27) into the fluid pressure tank (10), whereby a first of the two brake valves (24) is controlled by means of the pressure difference between the working pressure in the first working line (3) and the control pressure in the control line (20,21) acted upon by the greater pressure, and the second of the two brake valves (25) is controlled by means of the pressure difference between the working pressure in the second working line (4) and the control pressure in the control line (20,21) acted upon by the grater pressure.

7. Hydraulic controller according to claim 6, characterized in that, each brake valve (24; 25) is respectively connected with that working line (3; 4) which upon swinging out of the hydraulic pump (2) by means of action upon the setting pressure chamber (26; 27) associated with the brake valve (24; 25) forms the low pressure return line (3; 4) of the drive circuit (3,4).

8. Hydraulic controller according to claim 6 or 7, characterized in that, each brake valve (24; 25) is formed as a switching valve having a first switching position (44; 45) with non-throttled through-flow and a second switching position (70; 71) with throttled throughflow whereby the brake valve (24; 25) is in the first switching position (44; 45) when the pressure difference between the working pressure in the associated working line (3; 4) and the control pressure in the control line (20, 21) acted upon with the greater pressure is smaller than a predetermined threshold value, and the brake valve (24; 25) is in the second switching position (70; 71) when the pressure difference between the working pressure in the associated working line (3; 4) and the control pressure in the control line (20, 21) acted upon with the greater pressure is greater than the predetermined threshold value.

9. Hydraulic controller according to claim 6, characterized in that, each brake valve (24; 25) has two control pressure chambers (35, 36; 37, 38), whereby a first control pressure chamber (35; 38) is connected with the associated working line (3; 4) and the second control pressure chamber (36; 37) is connected with the control lines (20, 21).

10. Hydraulic controller according claim 9, characterized in that, the two control pressure chambers (36, 37) are connected with the control lines (20, 21) via a change-over valve (39).

11. Hydraulic controller according to claim 1 or 6, characterized in that, the brake valves (24, 25) are arranged in the control lines (20, 21).

12. Hydraulic controller according to claim 11, characterized in that, an after-suction arrangement (32), for the after-suction of pressure fluid out of the pressure fluid tank (10), is provided between the brake valves (24; 25) and the associated setting pressure chambers (26, 27).

13. Hydraulic controller according to claim 1 or 6, characterized in that, the control lines (20, 21) can be alternately acted upon with control pressure or vented to the pressure fluid tank (10) via a controller (17) connected with the pressure fluid tank (10) and a control pressure in-feed (19).

14. Hydraulic controller according to claim 1 or 6, characterized in that, a pressure cut-off valve (47) is provided for limiting the control pressure in the control lines (20, 21) to a maximum pressure.

* * * * *